United States Patent
Juan et al.

(10) Patent No.: US 8,208,091 B2
(45) Date of Patent: Jun. 26, 2012

(54) DISPLAY

(75) Inventors: Chen-Tsun Juan, Miao-Li County (TW); Bor-Bin Chou, Miao-Li County (TW); Li-Wen Chang, Miao-Li County (TW)

(73) Assignee: Young Lighting Technology Inc. (TW)

( * ) Notice: Subject to any disclaimer, the term of this patent is extended or adjusted under 35 U.S.C. 154(b) by 290 days.

(21) Appl. No.: 12/654,996

(22) Filed: Jan. 13, 2010

(65) Prior Publication Data

US 2010/0188596 A1   Jul. 29, 2010

(30) Foreign Application Priority Data

Jan. 23, 2009 (TW) .............................. 98201441 U (51) Int. Cl.
  *G02F 1/1333* (2006.01)
(52) U.S. Cl. .......................................... 349/58
(58) Field of Classification Search ................ None
  See application file for complete search history.

(56) References Cited

U.S. PATENT DOCUMENTS

| | | | | |
|---|---|---|---|---|
| 5,299,038 A | * | 3/1994 | Hamada et al. | 349/161 |
| 5,912,800 A | | 6/1999 | Sammakia et al. | |
| 6,104,451 A | * | 8/2000 | Matsuoka et al. | 349/58 |
| 6,693,682 B2 | * | 2/2004 | Fujishiro et al. | 349/65 |
| 7,133,281 B2 | | 11/2006 | Bae | |
| 7,948,575 B2 | * | 5/2011 | Oh et al. | 349/58 |
| 2002/0135712 A1 | * | 9/2002 | Menard | 349/60 |
| 2009/0147175 A1 | * | 6/2009 | Tsumura et al. | 349/58 |
| 2009/0225252 A1 | * | 9/2009 | Jeong | 349/58 |

FOREIGN PATENT DOCUMENTS

TW   M335701   7/2008

* cited by examiner

*Primary Examiner* — Tina Wong
(74) *Attorney, Agent, or Firm* — Bacon & Thomas, PLLC (57) ABSTRACT

A display includes a frame, a liquid crystal panel device, a flat light source device, a bracket structure, and a driving circuit board. The liquid crystal panel device and the flat light source device are disposed on the frame. The flat light source device has an illuminant surface toward the liquid crystal panel device. A first airway is formed between the flat light source and the liquid crystal panel device. The driving circuit board is fixed on the bracket structure and electrically connected with the liquid crystal panel device. A gap is formed between the driving circuit board and the flat light source to be an outlet of the first airway. The surface of the driving circuit board and the illuminant surface form an included angle, and the included angle is greater than or equal to 5 degrees and less than or equal to 135 degrees.

5 Claims, 6 Drawing Sheets

DISPLAY

BACKGROUND OF THE INVENTION (1) Field of the Invention

The invention relates to a display, and more particularly to an architecture of a display with a flat light source.

(2) Description of the Related Art

The liquid crystal display (LCD) is gradually popularized in recent years, and the light crystal display is generally applied in the electronic products including the computer, the personal digital assistant (PDA), the digital camera, the cell phone and so on. Because the light crystal display is not self-illumination display, by using the backlight the light crystal display may attain the purpose of the display. Thus the performance of the backlight directly affects the life and the performance of the picture quality and the consuming power of the light crystal display.

The types of the backlight of the light crystal display presently includes the cold cathode fluorescent lamp (CCFL), the light emitting diode (LED) and the non-mercuric flat fluorescent lamp (FFL) and so on. The FFL belongs to an area source, saves the use of the optical components, reduces the thickness of the backlight module and advances the great size of the light crystal display.

Figure 1:
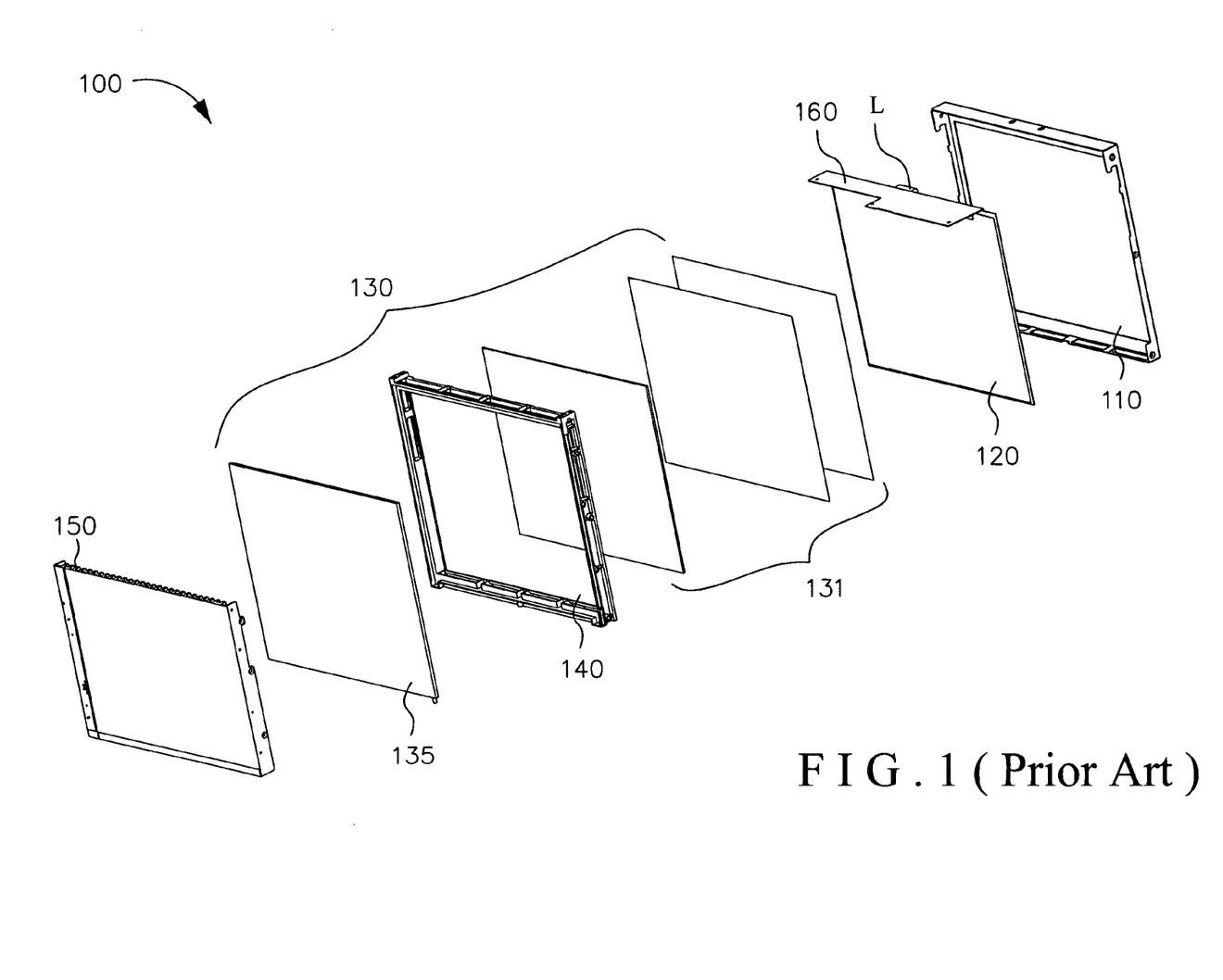
FIG. 1 is an exploded drawing of the conventional flat-light display.

Refer to FIG. 1 for an exploded drawing of the conventional liquid crystal display 100. General liquid crystal display 100 includes a front bezel 110, a liquid crystal panel device 120, a backlight module 130, a backboard 150, and a driving circuit board 160 such as T-CON board.

The backlight module 130 includes a plurality of optical films 131, a flat fluorescent lamp (FFL) 135, and a plastic frame 140. The optical films 131 and the FFL 135 are disposed in the plastic frame 140, and the optical films 131 are placed in front of the FFL 135. The liquid crystal panel device 120 is disposed in front of the optical films 131 of the backlight module 130. The liquid crystal panel device 120 and the backlight module 130 are disposed between the front bezel 110 and the backboard 150. The backboard 150 is placed behind the FFL 135.

Figure 2:
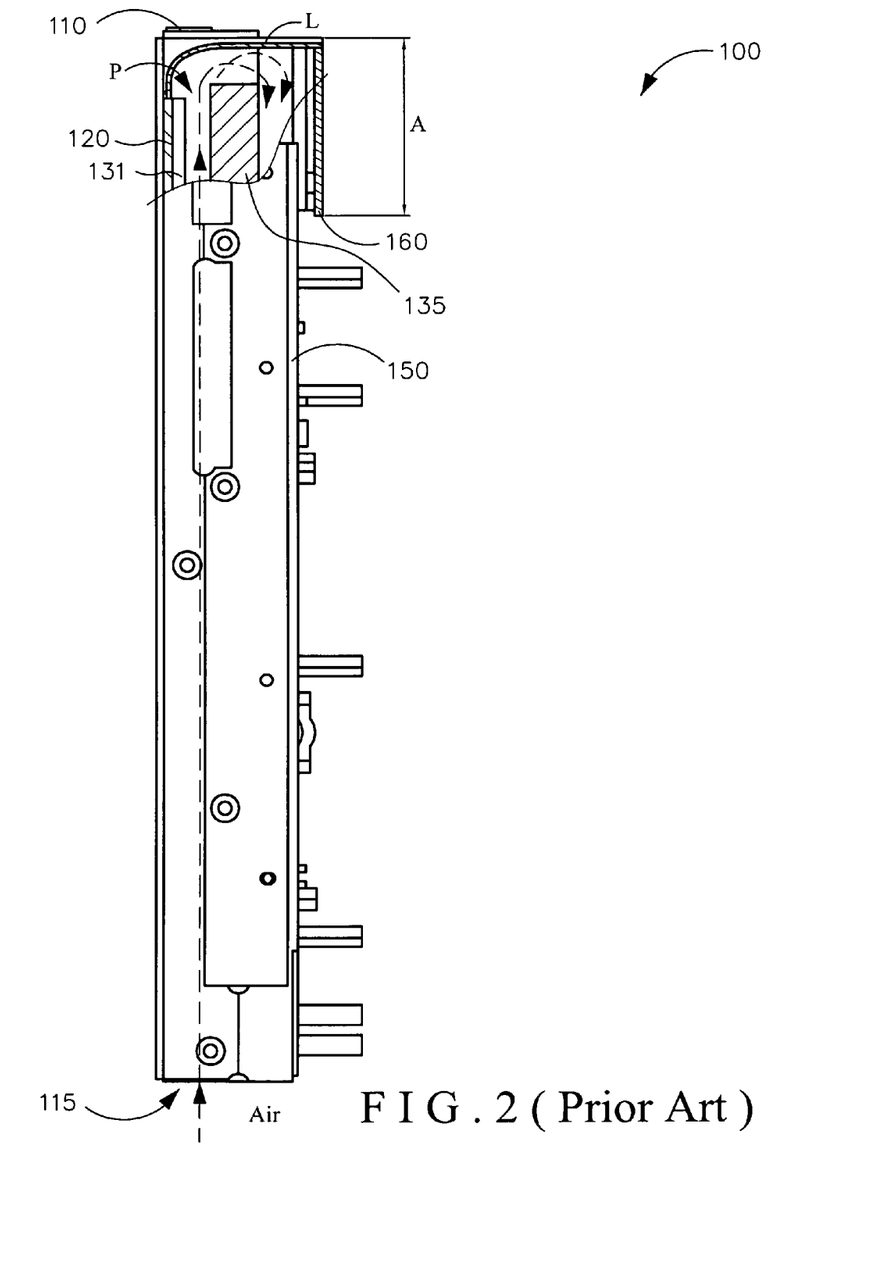
FIG. 2 is a partially sectional view of the conventional flat-light display.

Refer to FIG. 2 for a partially sectional view of the conventional flat-light display 100. The driving circuit board 160 and the FFL 135 are parallel and screwed to the backboard 150 with appressed way. The liquid crystal panel device 120 includes a flexible printed circuit L electrically connected with the driving circuit board 160. The driving circuit board 160 is used to accept a first control signal and transforms the first control signal to a second control signal, the second control signal may be read by the liquid crystal panel device 120. The flexible printed circuit L is used to accept the second control signal and delivers the second control signal to the liquid crystal panel device 120. The flat-light display 100 makes nature draft to scatter heat, and has an airway P placed between the optical films 131 and the FFL 135. And an inlet 115 of the airway P is placed under the flat-light display 100 to make cold air enter the flat-light display 100, as showing the dotted line.

In said flat-light display 100, the backboard 150 generally is the metal board made by swaging techniques. The material of the backboard 150 is the metal with poor thermal conductivity, not reserved for the use of scattering heat, and only provided the driving circuit board 160 screwed on, so might not shift the heat of the flat-light display 100.

The length of the flexible printed circuit L connected between the driving circuit board 160 and the liquid crystal panel device 120 is in the stationary standard. For fitting the length of the flexible printed circuit L, the driving circuit board 160 is appressed on the top right side of the backboard 150, as showing in the FIG. 2. For solving the length of the flexible printed circuit L in the standardization, the flexible printed circuit L might be processed by twice techniques. The flexible printed circuit L and the liquid crystal panel device 120 might be tip-off. Then, according to the requirement of the product, the fit length of the flexible circuit board L is welded on the liquid crystal panel device 120 again. However, because of human negligence, the flexible printed circuit L is easy to be damaged and reduced the yield rate of the production in the welding process.

Because the surface of the driving circuit board 160 is appressed on the top right side of the backboard 150, hot air might not scatter from the top of the flat-light display 100 after cold air entering from the inlet 115 of the flat-light display 100 proceeds heat-exchange. Then the heat gathered between the backboard 150 and the FFL 135 makes the temperature inside the backboard 150 rise. Because an area A directly contacting the heat is too large, the driving circuit board 160 is liable to age and reduce the service life.

SUMMARY OF THE INVENTION

Accordingly, the invention is to provide a display for improving thermal-scattering efficiency.

One embodiment of the invention provides a display including a frame, a liquid crystal panel device, a flat light source device, a bracket structure, and a driving circuit board. The liquid crystal panel device and the flat light source are disposed on the frame. The flat light source device is disposed on the frame and has an illuminant surface, and the illuminant surface is toward the liquid crystal panel device. A first airway is formed between the illuminant surface and the liquid crystal panel device. The bracket structure is connected with the frame. The driving circuit board is fixed on the bracket structure and electrically connected with the liquid crystal panel device. An included angle is between the surface of the driving circuit board and the illuminant surface of the flat light source device, and the included angle is greater than or equal to 5 degrees and less than or equal to 135 degrees. A gap is formed between the driving circuit board and the flat light source device, so as to be an outlet of the first airway.

In another embodiment, the display further includes a heat sink component disposed on the opposite side of the illuminant surface of the flat light source device. A second airway is formed between the heat sink component and the flat light source device, and an outlet of the second airway is between the driving circuit board and the heat sink component. Besides, the display further includes a thermal pad thermally connecting the flat light source device and the heat sink component.

In another embodiment, the heat sink component includes a plurality of fins. The bracket structure includes a first bracket and a second bracket. The driving circuit board is fixed on the first bracket, and the fins are fixed on the second bracket. The display further includes a print circuit board assembly (PCBA) fixed on the second bracket.

In another embodiment, the liquid crystal panel device includes a flexible printed circuit (FPC) board electrically connected with the driving circuit board.

The embodiment or the embodiments of the invention may have at least one of the following advantages. Compared to the conventional technology, the embodiment of the invention uses the bracket structure to fix the driving circuit board, and makes the driving circuit board and the flat light source device form the included angle and the outlet. The heat is delivered out by cold air from the bottom of the display, and scattered via the outlet on top of the display to improve thermal-scattering efficiency. Furthermore, the driving circuit board is slanted to avoid the heat directly affecting and accelerating age.

Other objectives, features and advantages of the present invention will be further understood from the further technological features disclosed by the embodiments of the present invention wherein there are shown and described preferred embodiments of this invention, simply by way of illustration of modes best suited to carry out the present invention.

BRIEF DESCRIPTION OF THE DRAWINGS

The present invention will now be specified with reference to its preferred embodiment illustrated in the drawings, in which.

DESCRIPTION OF THE PREFERRED EMBODIMENTS

In the following detailed description of the preferred embodiments, reference is made to the accompanying drawings which form a part hereof, and in which are shown by way of illustration specific embodiments in which the present invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 3:
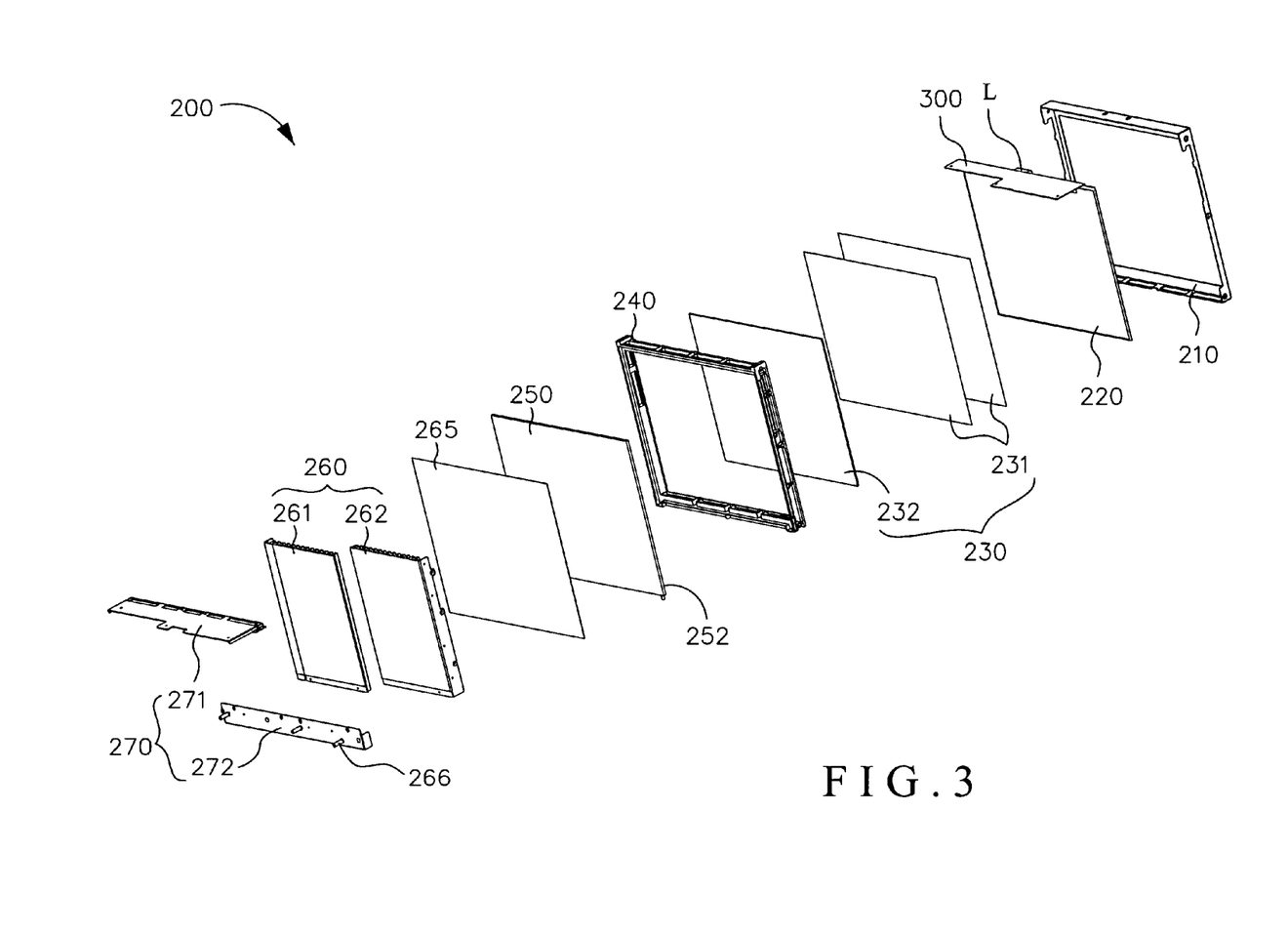
FIG. 3 is an exploded drawing showing an embodiment of the display according to the invention.

Referring to FIG. 3, the display 200 includes a front bezel 210, a liquid crystal panel device 220, a driving circuit board 300 such as a T-CON board, a plurality of optical films 230, a frame 240, a flat light source device 250, a heat sink component 260, and a bracket structure 270.

The front bezel 210 generally is the metal board made by swaging techniques. The front bezel 210 is disposed in front of the liquid crystal panel device 220 to protect the liquid crystal panel device 220 from harm. The liquid crystal panel device 220, the optical films 230, and the flat light source device 250 are disposed on the frame 240, and the flat light source device 250 has an illuminant surface 252. The illuminant surface 252 faces the liquid crystal panel device 220. The optical films 230 are disposed between the flat light source device 250 and the liquid crystal panel device 220. The optical films 230 include a plurality of brightness enhance films (BEF) 231 and a diffuser sheet 232.

The liquid crystal panel device 220 and the flat light source device 250 are disposed between the front bezel 210 and the heat sink component 260. The heat sink component 260 is disposed parallel to the opposite side of the illuminant surface 252 of the flat light source device 250. The heat sink component 260 may include one plate or a plurality of fins 261,262. In an embodiment, a thermal pad 265 is further disposed between the flat light source device 250 and the heat sink component 260, and is thermally connected between the flat light source device 250 and the heat sink component 260 to promote the thermal-scattering efficiency between the flat light source device 250 and the heat sink component 260.

The bracket structure 270 is fit to be assembled on the frame 240 and includes a first bracket 271 and a second bracket 272. The first bracket 271 connects with the top side of the frame 240, and the second bracket 272 connects with the bottom side of the frame 240. The fins 261,262 are fixed on the second bracket 272 by the screws 266.

Figure 4:
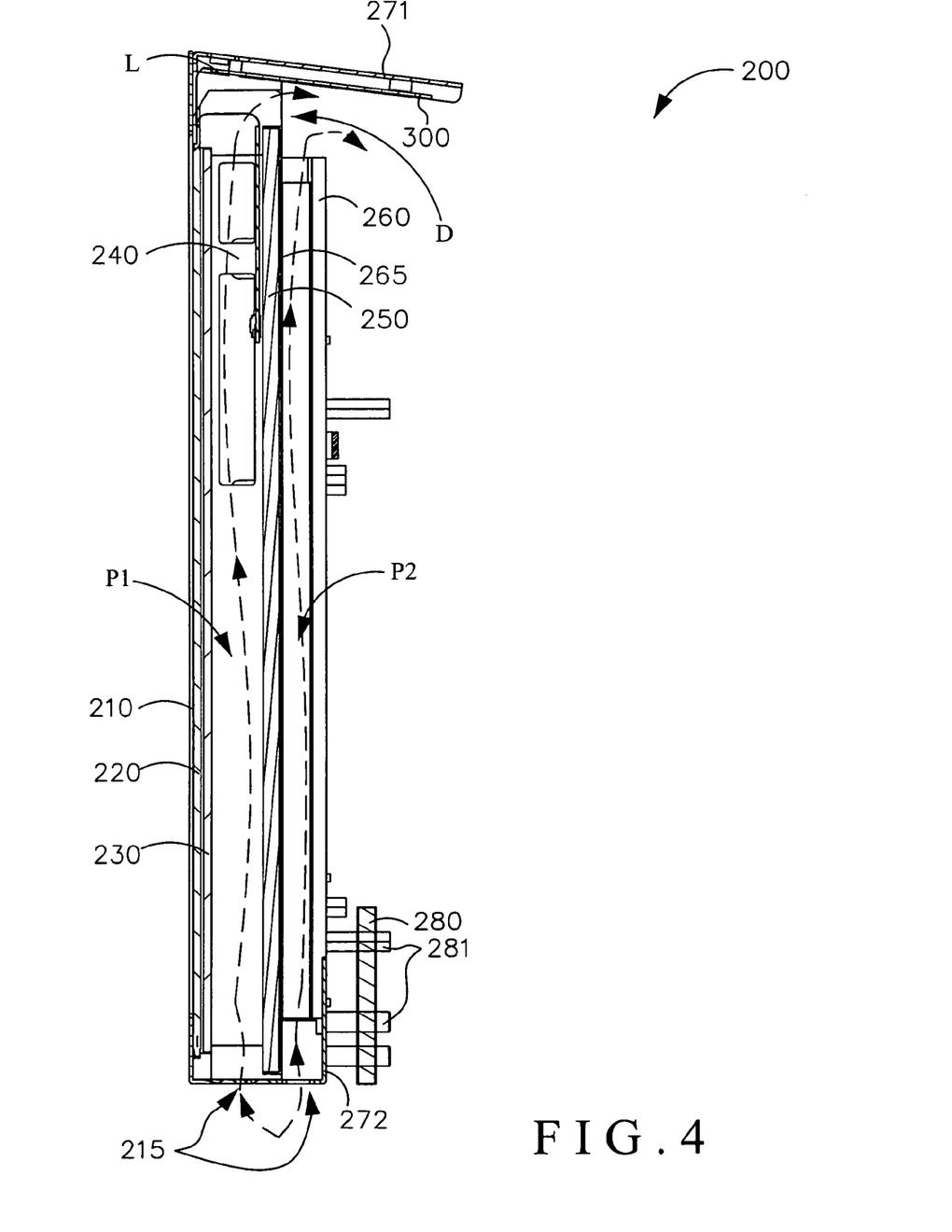
FIG. 4 is a sectional side elevation showing an embodiment of the display according to the invention.

Referring to FIG. 4, a gap is formed between the flat light source device 250 and the optical films 230 to form a first airway P1. In other words, the first airway P1 is between the flat light source device 250 and the liquid crystal panel device 220. A gap is formed between the heat sink component 260 and the flat light source device 250 to form a second airway P2, and an outlet of the second airway P2 is between the driving circuit board 300 and the heat sink component 260. The display 200 works on the principle of the nature draft to attain thermal-scattering efficiency. Since the air is heated by the flat light source device 250, the density of air decreases and floating power generates. As the dotted arrow showing in FIG. 4, air floats from down to up. As hot air on top of the display 200 unceasingly scatters out of the display 200, cold air on the bottom of the display 200 unceasingly floats into the display 200. So an inlet 215 is usually disposed on the bottom of the display 200, and the outlet is disposed on the top of the display 200.

Figure 5:
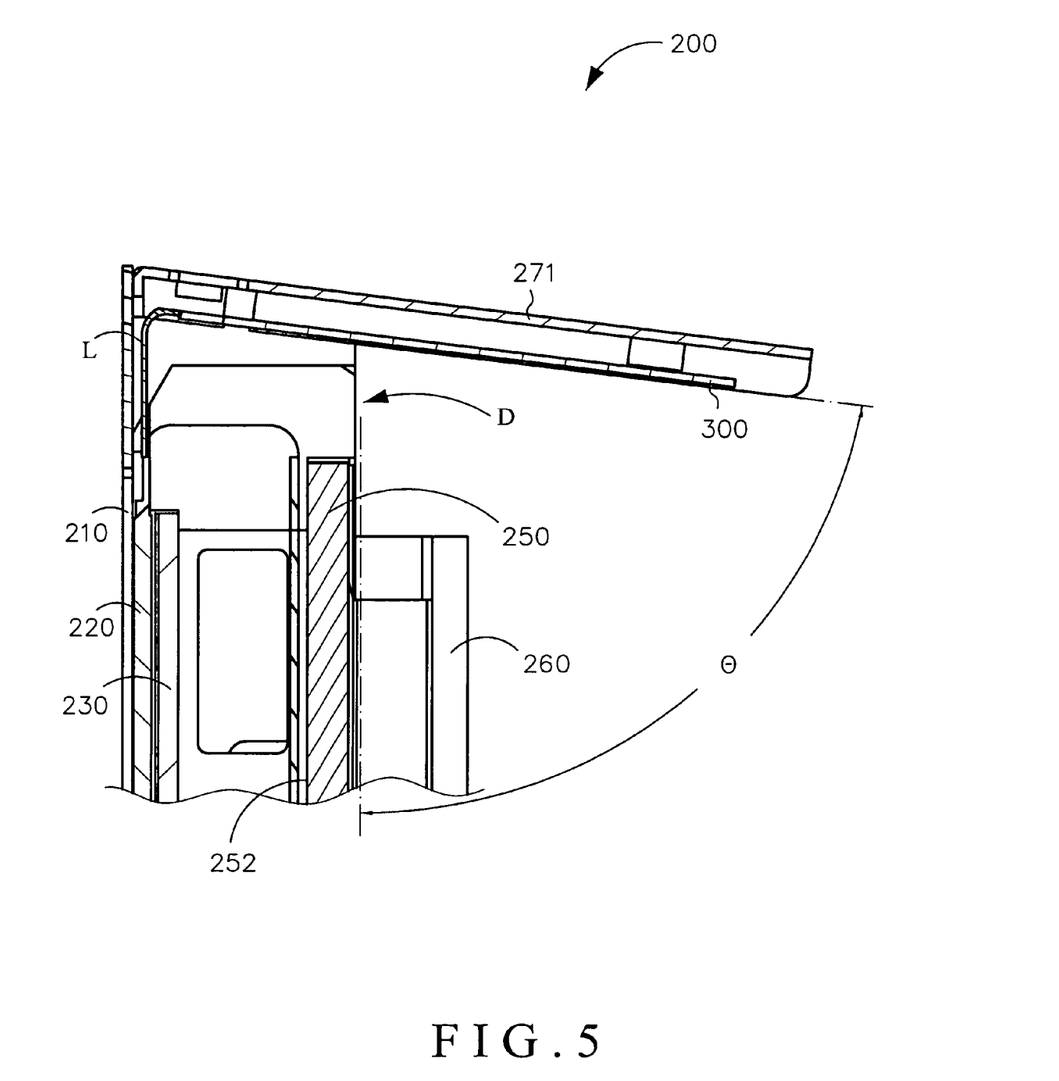
FIG. 5 is an enlarged vertical section showing an embodiment of the display according to the invention.

Referring to FIG. 5, the liquid crystal panel device 220 includes a flexible printed circuit (FPC) L, and the flexible printed circuit L is electrically connected with the driving circuit board 300. The driving circuit board 300 is used to accept a first control signal and transforms the first control signal to a second control signal, and the second control signal may be read by the liquid crystal panel device 220. The flexible printed circuit L is used to accept the second control signal and delivers the second control signal to the liquid crystal panel device 220. Because the flexible printed circuit L of the liquid crystal panel device 220 is a standard product, for fitting the length of the flexible printed circuit L, the driving circuit board 300 is fixed on the first bracket 271 on top of the display 200. Thus, the unsuitable length of the flexible printed circuit L are not trouble.

A gap D is formed between the driving circuit board 300 and the flat light source device 250 to be the outlet of the first airway P1. An included angle θ is formed between the surface of the driving circuit board 300 and the illuminant surface 252 of the flat light source device 250, and the included angle θ is greater than or equal to 5 degrees and less than or equal to 135 degrees. Thus, cold air from the inlet 215 below the display 200 is heated by the flat light source device 250 to form hot air. Because influenced by the principle of nature draft, the heat scatters with the air via the gap D on top of the display 200 to promote thermal-scattering efficiency. Because the included angle θ is formed between the surface of the driving circuit board 300 and the illuminant surface 252 of the flat light source device 250, and when hot air float up to the gap D, the surface of the driving circuit board avoids being heated too much and accelerated age.

In another embodiment, the display 200 further includes a printed circuit board assembly (PCBA) 280. The PCBA 280 is used to accept a third control signal and transforms the third control signal to the first control signal, and the first control signal may be read by the driving circuit board 300. The PCBA 280 is fixed on the second bracket 272 by the screws 281, and thermally connected with the heat sink component 260. Because the heat sink component 260 effectively scatters the heat via the gap D, and makes the temperature of the heat sink component 260 quickly decrease to avoid the PCBA 280 to be heated and accelerated age.

Figure 6:
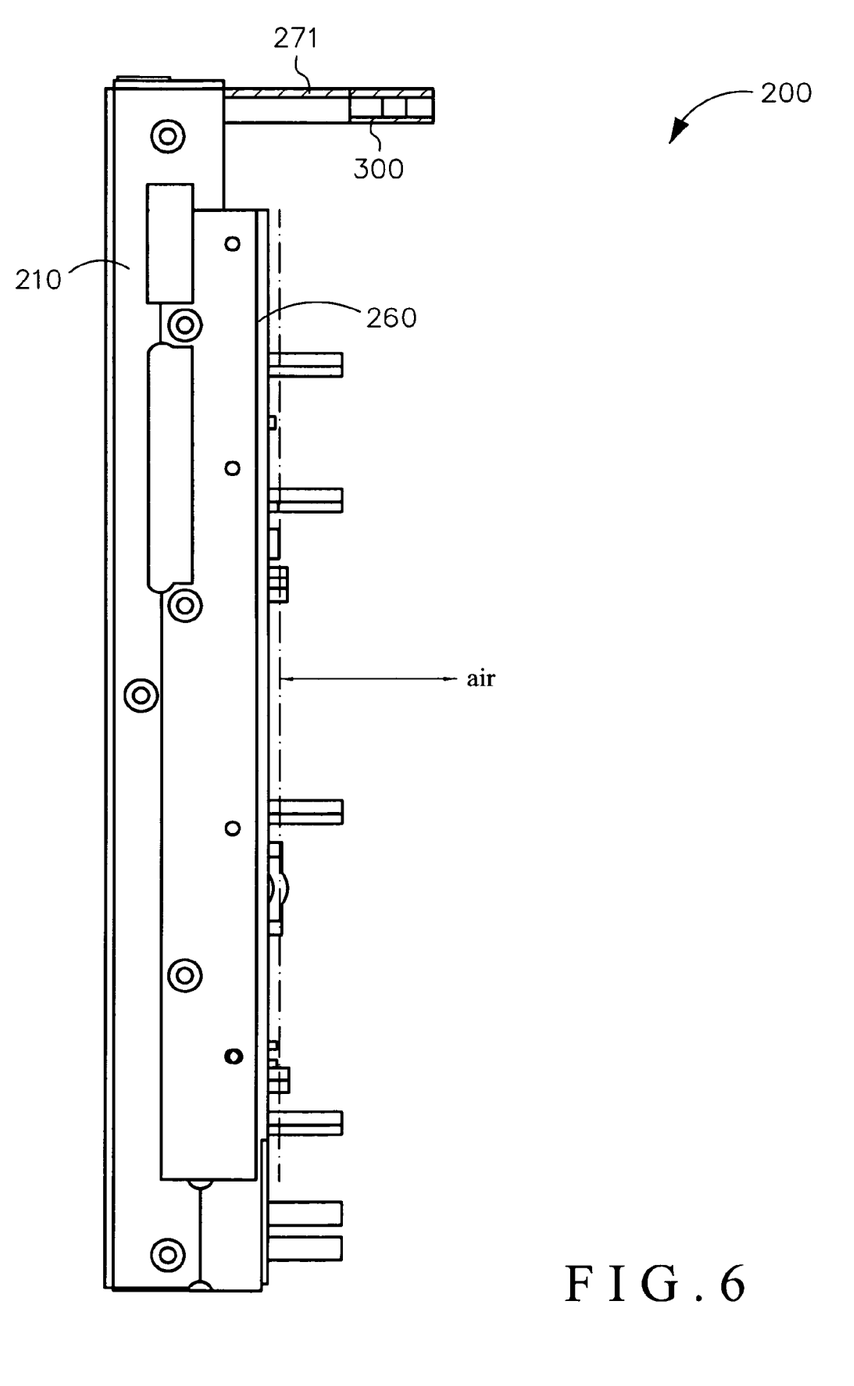
FIG. 6 is a diagram showing an embodiment of the heat sink components operating heat-exchange effect with air according to the invention.

Referring to FIG. 4 and FIG. 6, the flat light source device 250 conducts heat through the thermal pad 265 to distribute over the whole heat sink component 260 to make the heat sink component 260 scattered the heat all over. As the dotted line showing in FIG. 4, since the temperature of the air is lower than the temperature of the heat sink component 260 scattered the heat all over, the heat sink component 260 conducts heat to the air. The air produces the lower temperature to cold the temperature of the heat sink component 260, as showing the bidirectional arrow, and the heat sink component 260 operates thermal-scattering effect to make the heat of the flat light source device 250 scatter.

In summary, the embodiment or embodiments of the invention may have at least one of the following advantages:
1. because the heat sink component 260 having heat-scattering efficiency, the heat sink component 260 absorbing heat via the thermal pad 265 from the flat light source device 250 to make heat directly operate heat-exchange effect with air and bringing heat out, the heat sink component 260 providing the PCBA 280 screwed on to attain two purposes of screwing and heat-scattering; and
2. using the first bracket 271 to fix the included angle θ between the driving circuit board 300 and the flat light source device 250, making cold air entering from the bottom of the display 200 bring heat out and scatter heat via the outlet on top of the display 200 to improve the thermal-scattering efficiency, and the included angle θ making the driving circuit board 300 avoid heat directly affecting and accelerating age.

The foregoing description of the preferred embodiments of the present invention has been presented for purposes of illustration and description. It is not intended to be exhaustive or to limit the present invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the present invention and its best mode practical application, thereby to enable persons skilled in the art to understand the present invention for various embodiments and with various modifications as are suited to the particular use or implementation contemplated. It is intended that the scope of the present invention be defined by the claims appended hereto and their equivalents in which all terms are meant in their broadest reasonable sense unless otherwise indicated. Therefore, the term "the present invention", "the present invention" or the like does not necessarily limit the claim scope to a specific embodiment, and the reference to particularly preferred exemplary embodiments of the present invention does not imply a limitation on the present invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the present invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:
1. A display comprising:
   a frame comprising at least a top side and a bottom side;
   a liquid crystal panel device disposed on the frame;
   a flat light source device disposed on the frame and having an illuminant surface toward the liquid crystal panel device, wherein a first airway is provided between the illuminant surface and the liquid crystal panel device;
   a bracket structure comprising a first bracket and a second bracket connected with the frame, the first bracket connects with the top side of the frame and the second bracket connects with the bottom side of the frame; and
   a driving circuit board fixed on the first bracket structure and electrically connected with the liquid crystal panel device, wherein an included angle is formed between a surface of the driving circuit board and the illuminant surface of the flat light source device, the included angle is greater than or equal to 5 degrees and less than or equal to 135 degrees, and a gap is formed between the driving circuit board and the flat light source device to be an outlet of the first airway;
   a heat sink component disposed on the opposite side of the illuminant surface of the flat light source device, said heat sink comprising a plurality of fins affixed to the second bracket; and,
   a printed circuit board assembly fixed on the second bracket.
2. The display of claim 1, wherein a second airway is formed between the heat sink component and the flat light source device, and an outlet of the second airway is located between the driving circuit board and the heat sink component.

3. The display of claim 1, further comprising a thermal pad thermally connected between the flat light source device and the heat sink component.

4. The display of claim 1, further comprising a brightness enhance film and a diffuser sheet disposed between the flat light source device and the liquid crystal panel device.

5. The display of claim 1, wherein the liquid crystal panel device comprises a flexible printed circuit board electrically connected with the driving circuit board.

* * * * *